United States Patent
Florent et al.

(10) Patent No.: US 7,551,758 B2
(45) Date of Patent: Jun. 23, 2009

(54) MEDICAL VIEWING SYSTEM AND METHOD FOR DETECTING BORDERS OF AN OBJECT OF INTEREST IN NOISY IMAGES

(75) Inventors: Raoul Florent, Ville d'Avray (FR); Lucile Nosjean, Rueil Malmaison (FR); Pierre Lelong, Nogent sur Marne (FR); Peter Maria Johannes Rongen, Best (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 543 days.

(21) Appl. No.: 10/537,208

(22) PCT Filed: Nov. 26, 2003

(86) PCT No.: PCT/IB03/05495

§ 371 (c)(1),
(2), (4) Date: Nov. 2, 2005

(87) PCT Pub. No.: WO2004/051572

PCT Pub. Date: Jun. 17, 2004

(65) Prior Publication Data

US 2006/0155184 A1    Jul. 13, 2006

(30) Foreign Application Priority Data

Dec. 4, 2002   (EP) ................................. 02292995
Feb. 26, 2003  (EP) ................................. 03290455

(51) Int. Cl.
G06K 9/00  (2006.01)
(52) U.S. Cl. ...................................... 382/128; 382/130

(58) Field of Classification Search .......... 382/128–134, 382/164, 171, 177, 173, 179, 103, 100, 107, 382/154, 168, 190, 194, 199, 203, 206, 216, 382/274, 284, 285, 286, 291; 378/38, 168, 378/191; 128/916, 920, 922; 345/417–421, 345/424, 426, 581; 600/403, 411, 424–425, 600/436–437, 467; 601/2
See application file for complete search history.

(56) References Cited

U.S. PATENT DOCUMENTS 6,148,095 A * 11/2000 Prause et al. ................. 382/131

(Continued)

FOREIGN PATENT DOCUMENTS

WO        WO 02/02173 A1      1/2002

OTHER PUBLICATIONS

Dijkstra, J., et al.; Automatic Border Detection in IntraVascular Ultrasound Images for Quantitative Measurements of the Vessel; 2001; Comp. in Cardiology; 25-28.

(Continued)

*Primary Examiner*—Samir A. Ahmed
*Assistant Examiner*—Mehdi Rashidian

(57) ABSTRACT

The invention relates to a viewing system and a method for detecting an object of interest in a sequence of images (IS). Said object of interest is detected by first locating localizers related to said object of interest and by locating borders (BL) related to said object of interest using the location (LI, LZ) of said localizers. The viewing system according to the invention is able to produce a sequence of enhanced images in which the object of interest is enhanced, to measure some characteristics and to build a three dimensional representation of said object of interest. The viewing system is also able to register and combine said sequence of enhanced images with a sequence of reference images.

18 Claims, 12 Drawing Sheets

U.S. PATENT DOCUMENTS 7,194,117 B2 * 3/2007 Kaufman et al. ............ 382/128
7,397,935 B2 * 7/2008 Kimmel et al. ............. 382/128

OTHER PUBLICATIONS

Kompatsiaris, I., et al.; Deformable Boundary Detection of Stents in Angiographic Images; 2000; IEEE; 19:6:652-662.

Koning, G., et al.; Advanced Contour detection for three-dimensional intracoronary ultrasound; 2002; Int. Jour. Cardio. Imaging; 18:235-248.

Vezjak, M., et al.; System for Description of Identification of Individuals; 1991; IEEE; 1251-1254.

Dijkstra J et al; Automatic Border Detection in Intravascular Ultrasound Images for Quantitative Measurement of The Vassel, Lumen and Stent Parameters; Sep. 23, 2001; pp. 25-28; Computer in Cardiology 2001. vol. 28, IEEE Piscataway, NJ USA.

Vezjak, M et al; System for Description and Identification of Individuals; May 22, 1991; pp. 1251-1254; Slovenia NY, USA IEEE.

Koning G et al; Advanced Contour Detection for Three-Dimensional Intracoronary Ultrasound; a Validation—in vitro and in vivo; International Journal of Cardiovascular Imaging Kluwer Academic Publishers Netherlands; vol. 18 No. 4 Aug. 2002; pp. 235-248.

* cited by examiner

MEDICAL VIEWING SYSTEM AND METHOD FOR DETECTING BORDERS OF AN OBJECT OF INTEREST IN NOISY IMAGES

FIELD OF THE INVENTION

The invention relates to a viewing system, comprising acquisition means for acquiring a sequence of images, detection means for detecting an object of interest in said sequence of images, and viewing means for displaying said sequence of images. The invention also relates to a method to be used in said system. The invention also relates to a medical examination apparatus coupled to such a system.

The invention finds its application for example in medical imaging systems for the detection of objects of interest such as stents and artery walls in angiograms.

BACKGROUND OF THE INVENTION

A method for detecting stents in medical images is already known from the publication entitled "Deformable Boundary Detection of Stents in Angiographic Images", by Ioannis Kompatsiaris et alii, in IEEE Transactions on Medical Imaging, Vol. 19, no 6, June 2000, pages 652-662. This document describes an image processing method for deformable boundary detection of medical tools, called stents, in angiographic images.

A stenosis is a narrowing of a blood vessel. When a stenosis is identified in a coronary artery of a patient, a procedure called angioplasty or Percutaneous Transluminal Coronary Angioplasty (PTCA) may be prescribed. A basic idea of PTCA is to position a monorail with a small inflatable balloon within a narrowed section of an artery. The balloon is inflated in order to push outwards against the wall of the narrowed artery. This process reduces the narrowing until it no longer interferes with the blood flow. The balloon is then deflated and removed from the artery. In order to avoid re-stenosis to occur, said process is often followed by a stent implantation. A stent is a surgical stainless steel coil that is introduced in the artery on another balloon monorail. The stent is wrapped tightly around the balloon attached to the monorail. Said balloon tipped monorail is introduced into the artery. The inflation of the balloon causes the stent to expand, pressing it against the artery wall. The stent, once expanded, can be considered as a permanent implant, which acts like a scaffold keeping the artery wall open and allowing normal blood flow to occur through the artery. Stent placement helps many patients avoid emergency heart bypass interventions and/or heart attacks.

A key step of said procedure is to check whether the stent has been placed at the right position of the stenosis and whether it has been successfully expanded. As a matter of fact, clinical problems are associated with inadequate placement or expansion of the stent. Inadequately expanded stents can locally disrupt blood flow and cause thrombosis.

During a PTCA it is possible to observe in real time the area of the stenosis in a sequence of angiographic images, but the precise stent placement is not easily visible for several reasons:

the image sequence is rather noisy and its contrast is low due to the use of a low X-Ray dose, the stent location changes all along the image sequence due to the influence of cardiac pulses and the patient's breathing.

Studies revealed that, consequently, more than eighty per cent of stents might be insufficiently dilated despite an apparently successful deployment in the sequence of angiographic images. Automatic detection of the stent border could, therefore, help to achieve a more precise checking of the stent placement.

The method that is disclosed in the cited publication relies on the identification of the stent in the angiographic images. It comprises the steps of:

forming 3D models of stents, deriving a set of 2D models using perspective rules, matching said 2D models with real angiographic images in a training phase, roughly detecting a stent in an angiographic image using the set of 2D models and maximum likelihood criteria, refining the borders of the roughly detected stent using an active contour model.

A drawback of said method is that it presents a calculation load that is actually too heavy for real time processing of a sequence of images in the intervention phase of stent implantation.

SUMMARY OF THE INVENTION

It is an object of the invention to propose a less complex solution to detect the borders of an object of interest in a sequence of noisy images.

A viewing system according to the invention as described in the opening paragraph comprises acquisition means for acquiring a sequence of images, detection means for detecting an object of interest in said sequence of images, said detection means comprising:

localizer detection sub-means for detecting a location of localizers related to said object of interest, border detection sub-means for detecting a location of borders related to said object of interest, and viewing means for displaying said sequence of images.

The viewing system according to the invention comprises detection means for indirectly detecting the borders of the object of interest. To this end, said detection means comprise localizer detection sub-means which are intended to search for localizers instead of searching for the object of interest. An advantage is that localizers have been especially designed for being visible in an angiographic image: they are simply shaped objects made of radio-opaque material, unlike for example a stent or a stenosis which have a low contrast and a complex shape. Consequently, said localizers can be detected easily without involving complex models.

The detection means also comprise border detection sub-means which are intended to find the borders of the object of interest as the most salient borders including said localizers. During a procedure of stent placement for instance, the stent borders are usually more visible than the borders of the coronary artery. When the artery borders are searched for, some contrast agent may be injected, in order to enhance them.

Therefore, the detection means according to the invention are not very complex, thus allowing their implementation in real time.

The viewing system according to the invention further comprises enhancement means for enhancing the borders of the object of interest, using the location of said borders, and delivering an enhanced sequence of images. The knowledge of said location allows an outstanding enhancement of the contour of the object of interest. In the domain of angiography such an outstanding enhancement may help check the stent position and deployment.

The viewing system according to the invention also comprises measurement means for measuring characteristics of said object of interest using said location of borders. An advantage of said characteristics, which are for instance different widths of the object of interest along its length, is that they can be used for objectively evaluating for instance the severity of a stenosis or its reduction by a stent.

The viewing system according to the invention also comprises three dimensional (3D) representation means for representing said object of interest in three dimensions. An advantage is that said 3D representation is easily obtained from said object borders and some a priori knowledge of this object. A 3D representation of a tubular object of interest like a stent or a stenosis may for instance be derived from the knowledge of its border location in two views and the assumption of a cylindrical shape with a variable elliptical section.

BRIEF DESCRIPTION OF THE DRAWINGS

The invention will be further described with reference to the accompanying drawings.

DETAILED DESCRIPTION OF THE INVENTION

The invention relates to a viewing system and to a method that is used to actuate the viewing system, for the detection of borders of an object of interest in real time in a sequence of noisy images. The viewing system and the method of the invention are described hereinafter by way of example in an application relating to the medical field of cardiology. In said application, the object of interest is an organ such as an artery or a tool such as a balloon or a stent. These objects are observed during a medical intervention called angioplasty or PTCA, in a sequence of X-ray fluoroscopic images called angiogram.

It is to be noted that the system and method may be applied to any object of interest other than a stent or an artery in images other than angiograms.

Figure 1A:
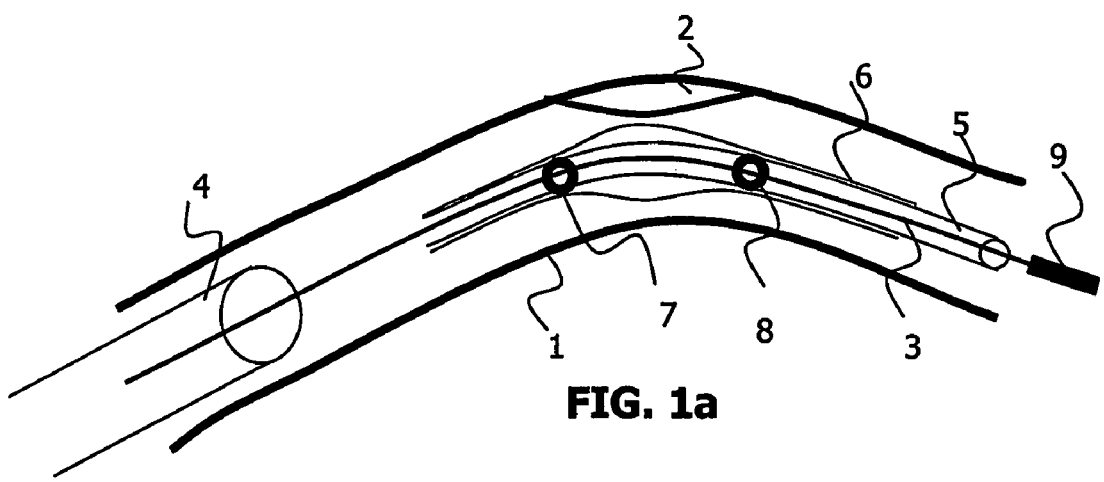
FIGS. 1a, 1b, 2a and 2b illustrate two steps of angioplasty: during balloon inflation and during stent deployment at the location of a stenosis.
Figure 1B:
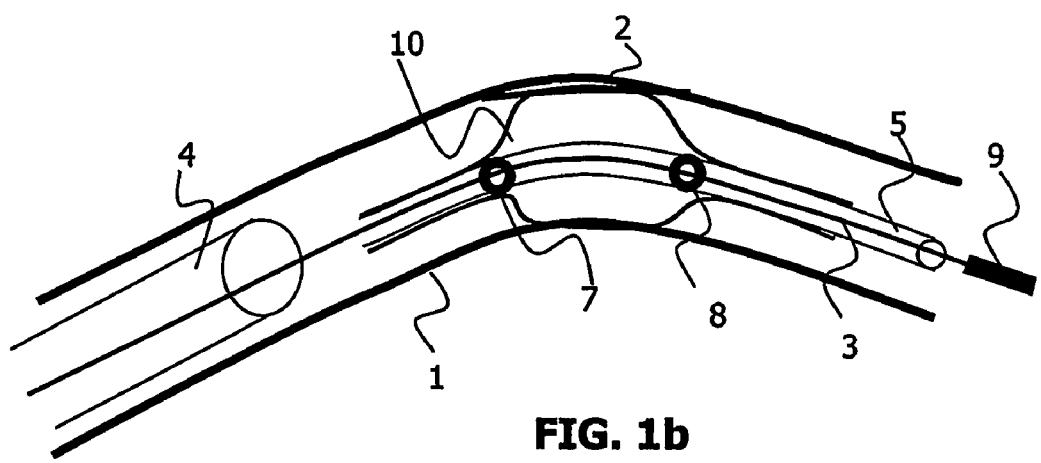

Referring to the FIGS. 1a to 2b, in the application described hereinafter the stent implantation is a medical intervention that usually comprises several steps for enlarging an artery at the location of a lesion called stenosis. In a preliminary step, the practitioner localizes a stenosis 2 in a patient's artery 1 in the sequence of images. In a first phase, illustrated by FIG. 1a, he/she introduces a thin guide wire 3 through the lumen of the artery 1 using a catheter 4. Said guide wire 3 is extended beyond the stenosis 2. It is to be noted that said guide wire 3 has a radio-opaque tip 9 at its extremity, which helps the practitioner check in a sequence of images whether the guide wire 3 is properly introduced. A thin tube 5 called a monorail is then easily slipped onto the guide-wire 3 and placed in the stenosis area. Said monorail 5 has a balloon 6 wrapped around it. Said balloon 6 has two radio-opaque balloon markers 7 and 8 that help the practitioner place the balloon 6 in the correct position with respect to the stenosis 2. The balloon 6 is then inflated with a high pressure as shown in FIG 1b, thus becoming an inflated balloon 10, in order to force the artery open. Once the practitioner has checked that the stenosis 2 has been suitably reduced, the inflated balloon 10 is deflated so as to let the blood flow and the monorail 5 is removed from the artery 2.

Figure 2A:
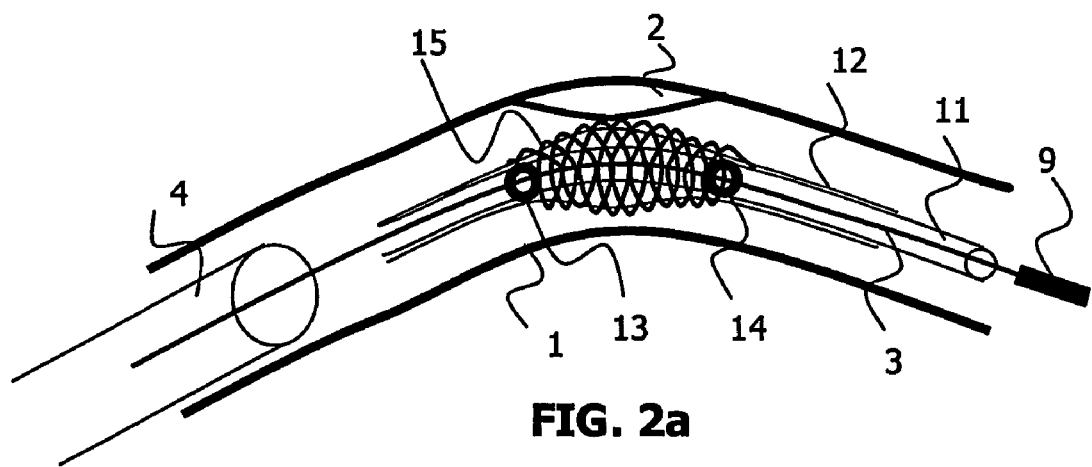
Figure 2B:
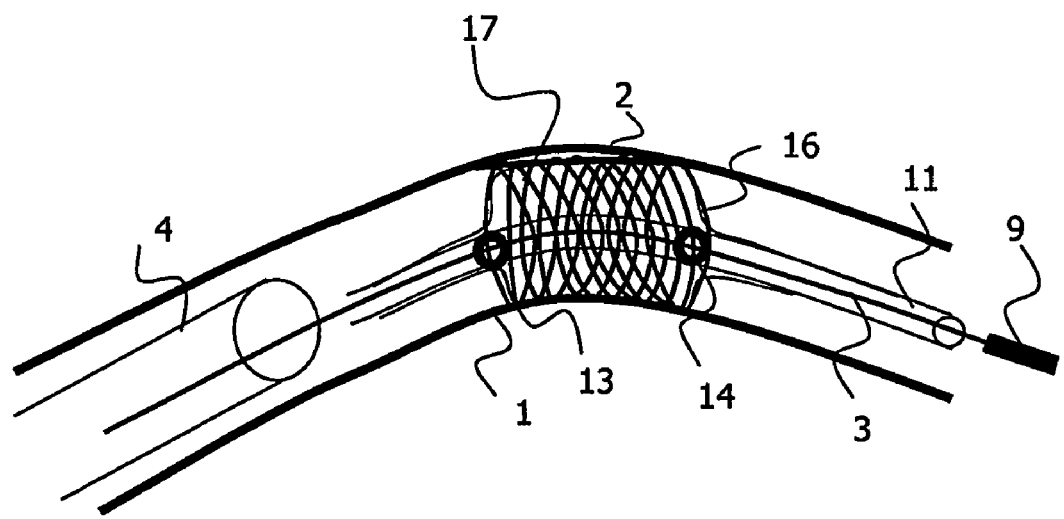

In a second phase illustrated by the FIGS. 2a and 2b, another monorail 11 is introduced into the lumen of the artery 1. Said monorail 11 also has a balloon 12 wrapped around it, with two balloon markers 13 and 14, but in addition a stent 15 is put over said balloon 12. The balloon 12 is inflated so as to become an inflated balloon 16 and expand the stent 15 which thus becomes an expanded stent 17. Then, considering the expanded stent 17 as a permanent implant, the inflated balloon 16, the monorail 11, the guide wire 3 and the catheter 4 are removed.

It should be noted that the first phase is not compulsory, but often performed by practitioners in order to check in advance whether it is possible to enlarge the artery before introducing the stent.

As mentioned above, a key point of the intervention is to place the stent properly in the stenosis area. To this end, the practitioner visualizes the area of the stenosis in real time in a sequence of images several times during the intervention.

According to the invention, the viewing system comprises detecting means for detecting an object of interest in said sequence of images. As is shown in the functional diagram of FIG. 3, said detecting means 20 comprise localizer detection sub-means 30 for detecting a location of localizers related to said object of interest and border detection sub-means 60 for detecting a location of borders related to said object of interest A sequence of images IS is presented to said detecting means 20. For an image $I_0$ of said sequence IS said localizer detection sub-means 30 search for localizers related to the object of interest. Said localizers may have various shapes and be located inside or outside the object of interest.

Figure 4A:
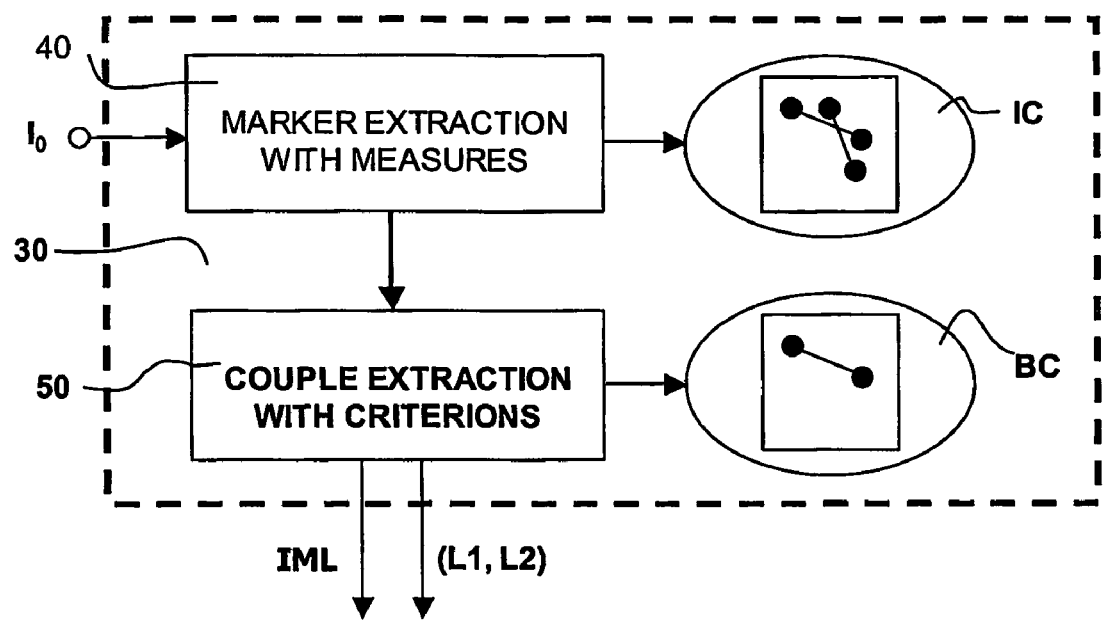
FIG. 4a is a functional block diagram of the localizer detection sub-means according to the invention.

In a preferred embodiment of the invention the object of interest is a stent or a stenosis. The problem is that such an object of interest is a hardly radio-opaque object of interest which moves on a moving background. Therefore, the stent or the stenosis is preferably detected indirectly by locating related balloon markers. Said balloon markers are disposed at each extremity of the balloon. The balloon-markers are recognizable particularly because they constitute punctual zones, practically black or at least dark in the angiographic images. They are also very similar in shape. Referring to FIG. 4a, the localizer detection sub-means 30 comprise marker extraction sub-means 40 which perform elementary measures for extracting candidates of markers and forming candidates of couples of markers.

It is to be noted that other types of localizers may be used for the detection of stent or artery borders. Some stents have their own stent markers, which are located on their borders. The tip of the guide wire shown in the FIGS. 1a to 2b could also be considered as a single localizer for stenosis border detection during the procedure of tip placement. As a matter of fact, said tip, which marks the extremity of the guide wire, also indicates whether the guide wire has passed the stenosis area or not. Such a procedure of tip placement is rather critical because of the artery narrowing. Therefore, the detection of the stenosis borders during said procedure may help the practitioner pass the guide wire correctly through the stenosis. Said tip may be detected using ridge enhancement filtering means followed by thresholding means and skeletonization means.

Figure 4B:
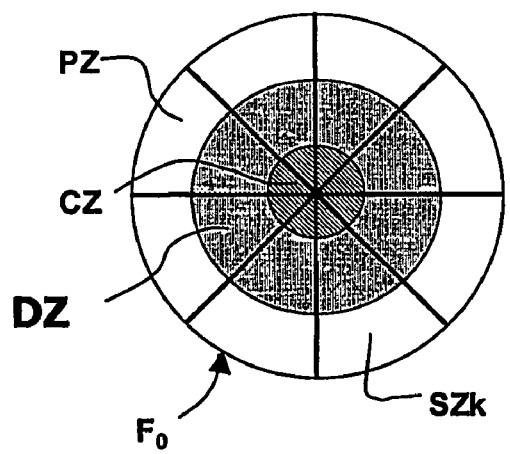
FIG. 4b shows a circular filter for extracting balloon markers according to the invention.
Figure 5:
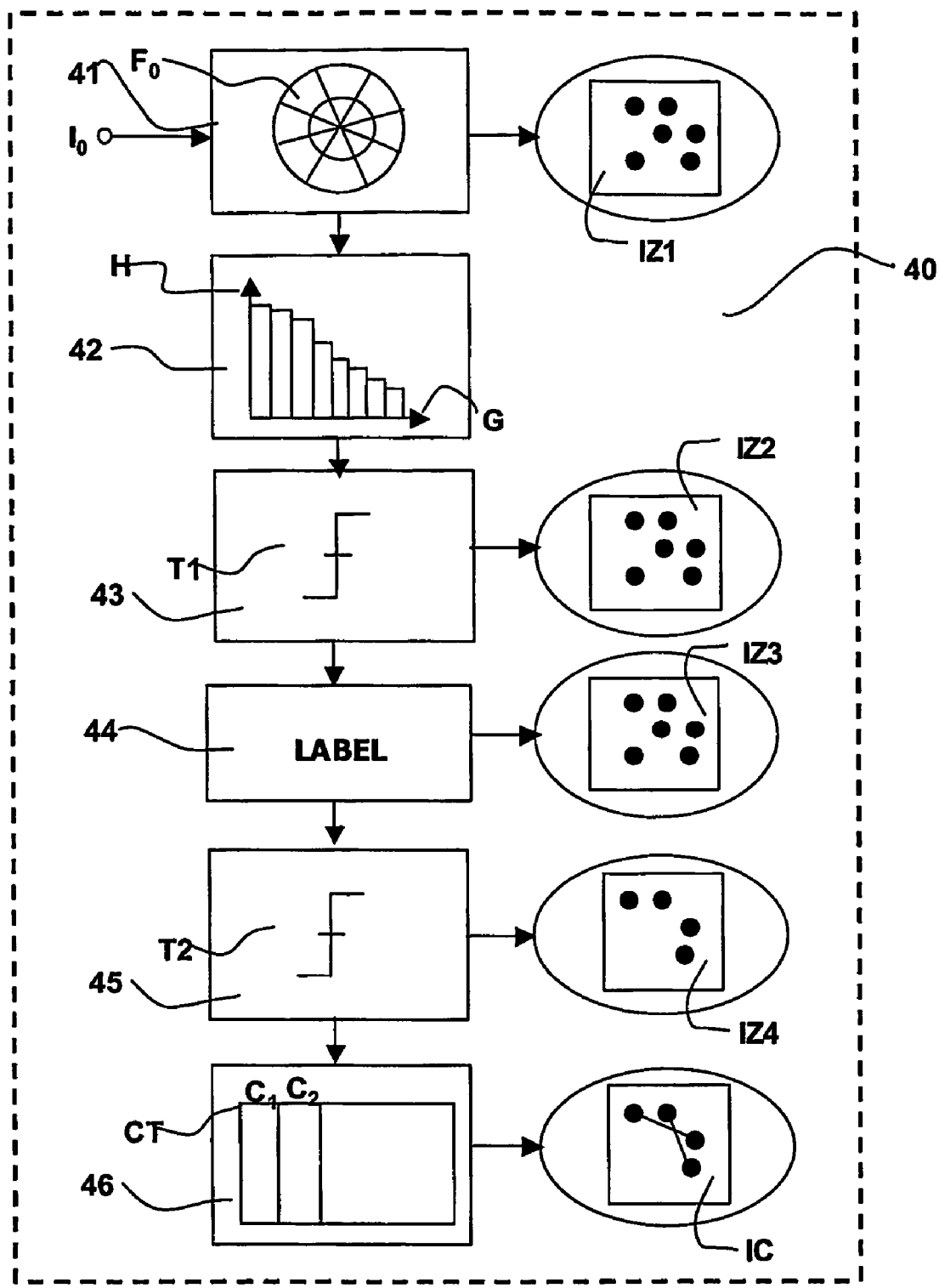
FIG. 5 is a functional block diagram of the marker extraction sub-means according to the invention.

In the preferred embodiment of the invention, the localizers are balloon markers. Referring to FIG. 5, the marker extraction sub-means 40 comprise several elementary measure sub-means, which are intended to characterize the candidates of markers:

First measure means 41 that select punctual dark zones contrasting on a brighter background: This measure is provided by filter means, denoted by $F_0$. In a preferred embodiment (referring to FIG. 4b), an appropriate filter comprises three circular concentric zones, including a central zone CZ, a dead zone DZ and a peripheral zone PZ. The filter $F_0$ is also divided into n sectoral zones SZ covering 360° and numbered 1 to n. A current sectoral zone $Z_k$ is numbered k with $1 \leq k \leq n$. The first measure consists in scanning a current image of the sequence of images in order to look for a punctual dark zone. A punctual dark zone can be detected when said punctual dark zone is centered in the filter. When a punctual dark zone is centered, it occupies the central zone CZ of the filter and it occupies possibly a part of the dead zone DZ. The first measure is based on the estimation of contrast of intensity between the central zone CZ and the peripheral zone PZ. Said estimation of contrast may be carried out by estimating the difference of the average of intensities between the central zone CZ and peripheral zone PZ. This simple measure would conduct to a linear estimation of the contrast. In order to refine the result of this estimation, the first measure is actually carried out by calculating the minimum of the n averages of intensities determined in the n peripheral sectoral zones separately. These minimum values of intensities are denoted by:

$I_{Pk}$=average of intensity in the peripheral sectoral zone numbered k, and $I_{CZ}$=average of intensities in the central zone CZ.

The final measure provided by the filter $F_0$ is:

$$I_{F0} = \min_k(I_{Pk}) - I_{CZ}$$

This measure $IF_0$ is determined by scanning each pixel of the original image $I_0$ with the filter $F_0$. It provides an enhanced image, denoted by IZ1, of punctual dark zones, denoted by Z, where all other structures have disappeared, with the exception of said punctual dark zones that are now candidates to constitute markers.

Second measure means 42 comprising histogram means denoted by H: in this image IZ1, each pixel has a gray level. From the image IZ1, there is constructed an histogram, which represents the different numbers H of pixels corresponding to each gray level value G. To the right of the axis G in FIG. 5, there are the high gray level values and to the left of the axis G the low gray level values are stated. For each gray level value G, the height H of the box represents the number of pixels to be found having said gray level value. Since the average size of a punctual dark zones Z is determined by the characteristics of the filter $F_0$, it is possible to estimate the size of a punctual zone in pixels. Assuming that the size of a punctual zone is p pixels, and assuming that for example a number z of zones is to be found in the image IZ1, a number of p.z (p times z) pixels that have the highest gray levels is searched. The histogram H as shown in FIG. 5. permits of accumulating the number of pixels in adjacent boxes, starting from the right of the axis G, until the estimated number of p.z pixels is reached for the image, i.e. for z zones of p pixels each, while choosing the p.z pixels having the highest gray levels, i.e. the pixels in the boxes to the right of the G axis. The histogram H permits of determining a gray level $G_H$, which yields the p.z pixels.

Third measure means 43 comprising threshold means denoted by $T_1$; a first intensity threshold $T_1$ is then applied to the image IZ1. The threshold $T_1$ is chosen equal to the previously determined gray level $G_H$. That permits of selecting in the image IZ1 said number p.z of pixels having at least a gray level equal to $G_H$. A new image is formed for which the intensities and the coordinates of the pixels are known, thus forming the image of points IZ2.

Fourth measure means 44, called label means, which perform a connectivity analysis on pixels previously selected for the image IZ2, in order to connect pixels pertaining to a same punctual dark zone Z. The labeling means 44 provide a number of labeled punctual dark zones in a new image IZ3.

Fifth measure means 45 comprising second threshold means $T_2$: This second threshold $T_2$ is applied, for example, to the intensities of the pixels of the image IZ3 of labeled zones and to the diameter of the zones in order to select the best labeled zones. For example, $T_2$ equals a product of a given intensity and a given diameter, in order to select a number of remaining punctual zones having the highest intensities and the best shapes for constituting markers, thus yielding an image of markers IZ4.

Sixth measure means 46 using a table, denoted by CT; this table CT of possible couples C1, C2, . . . of selected punctual dark zones is constructed on the basis of a-priori known distance IM between the markers, that is with an incertitude of for example 20%. The table CT provides an image IC of the possible marker couples C1, C2, . . . .

Referring to FIG. 4a and based on the image IC of possible marker couples, the localizer detection sub-means 30 further comprise couple extraction sub-means 50 for extracting the best couple of markers based on criterions among which:

A criterion of distance: the distance between the markers of the best couple must be very near the a-priori known distance IM with a given incertitude.

A criterion of strength: the strength of the best couple must be larger than the strength of the other couples. The strength of a given couple may be determined as the average of enhanced intensities yielded by the filter $F_0$.

A criterion of similarity: the markers of the best couple must be very similar structures. The similarity of the markers of possible couples is determined. Once the punctual dark zones Z of p pixels are determined, their centroids are calculated. Small Regions Of Interest, denoted by ROI are defined around each centroid, as represented by white squares in FIG. 6b. For each possible couple correlation is calculated between the corresponding ROIs. Strong correlation is an indication that the two strongly correlated ROIs correspond to the markers of a couple of markers.

A criterion of continuous track: the markers of a couple are carried by a monorail, which is guided by a guide wire. The guide wire is more or less visible. However, it may be enhanced by a ridge filter. So, if the markers of a possible couple are situated on a track corresponding to a ridge joining them, this constitutes another indication that the two zones located at the extremities of the continuous track correspond to a couple of markers. Such a continuous track may be qualified by estimating the average ridgeness along the path joining the two zones. The measure of average ridgeness must provide a track that has a shape as close to the shape of a segment or of a parabola as possible.

The detection of a continuous track connecting the couple of markers may be performed using a fast marching technique. This technique, well known to those skilled in the art, first attributes a cost to the pixels located in a neighborhood of the couple of markers. Said cost is for instance inversely proportional to the above calculated ridgeness. Said technique also forms a path between both markers which minimizes a total cost in a graph made of the pixels of said neighborhood. Hereinafter, said continuous track will be called an inter-marker line IML. It is to be noted that the guide wire is present on a large portion of the artery and that consequently the inter-marker line may be detected beyond the markers.

A criterion of motion: the markers in the coronary artery are moving rapidly with respect to the cardiac pulses. False alarms, that is dark punctual zones that pertain to the background, are moving much more slowly with the patient's breathing. In order to eliminate these possible false alarms, a temporal difference is formed between two successive images of the sequence. This difference provides a measure of temporal contrast. The measure of temporal contrast permits of detecting the dark punctual zones showing an important temporal contrast. This measure is also an indication of a possible couple of markers, since false alarms have a feebler temporal contrast.

All described criterions are combined using a fuzzy logic technique for deriving a composite measure. The higher the composite measure is, the higher is the probability of the presence of a couple of markers. The highest composite measure permits of selecting the best couple of markers from the image of couples IC issued by the marker extraction means 1. The coordinates of said markers denoted by ($L_1$, $L_2$) in FIG. 4*a* and the coordinates of the pixels forming the inter-marker line IML are output.

Figure 6A:
FIG. 6a shows an original angiogram.
Figure 6B:
FIG. 6b shows two zones of detected markers and FIG. 6c shows an enhanced object of interest on a filtered background.
Figure 6C:
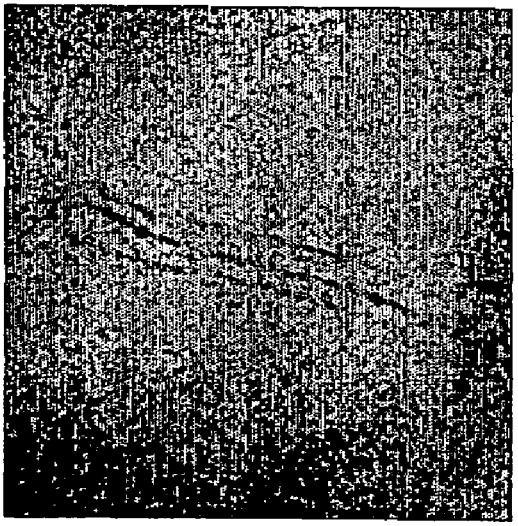

FIG. 6*a* shows an original image of a medical sequence representing a catheter, a guide wire, a balloon with balloon markers (as two small dark points) and an artery on a background of other organs. The visualization of the objects of interest (balloon and artery) is very difficult. Even the balloon markers are hardly visible. FIG. 6*b* shows the original image with zones delimited in white, which are intended for the determination of the punctual dark zones. In FIG. 6*c*, the objects of interest are enhanced and the background is filtered.

For improving the comfort of the clinician during the intervention, the localizers may be temporally registered during the visualization of the image sequence with respect to the frame of the image, by matching corresponding localizers of a current image and of a reference image in the sequence of images. The localizer registration allows further registering of the objects of interest, which practically do not move with respect to the localizers. Thus, the object of interest may be zoomed, as shown in FIG. 6*c*, without said object being shifted out of the image frame. Moreover, temporal filtering means may be used in combination with the means of the invention to further improve the images of the sequence.

Figure 3:
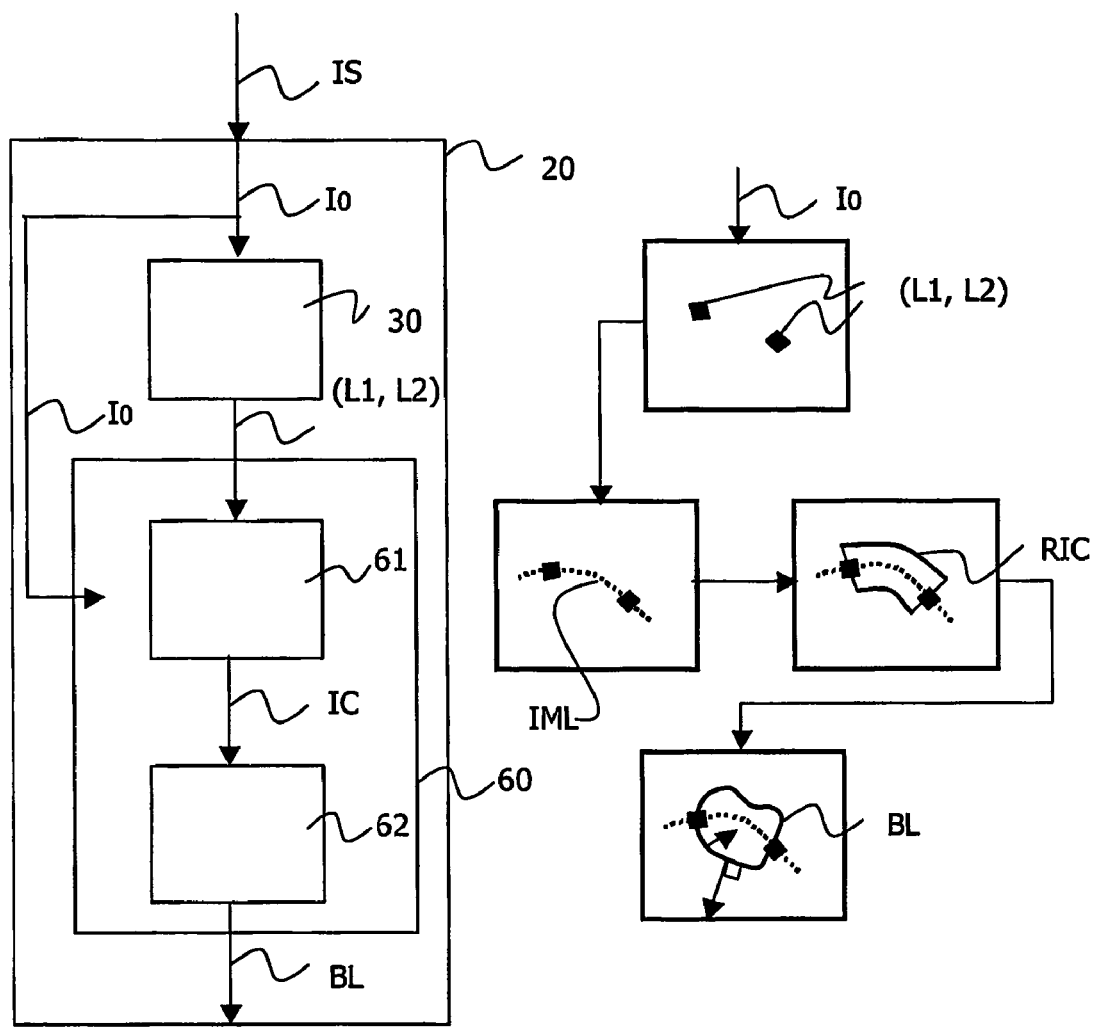
FIG. 3 is a functional block diagram of the detection means according to the invention.

Said image $I_0$, said marker coordinates ($L_1$, $L_2$) and said inter-marker line IML are then processed by the border detection sub-means 60 presented in FIG. 3. Said border detection sub-means 60 aim at deriving the borders of the object of interest from the knowledge of the localizer's location ($L_1 I$, $L_2$). In the preferred embodiment of the invention, this may for instance be carried out by an active contour technique (also called "snake"). This technique, well known to those skilled in the art, first of all consists in defining an initial contour and secondly in making said initial contour evolve under the influence of internal and external forces. To this end said border detection sub-means 60 comprise initialization sub-means 61 and active contour sub-means 62 as shown in FIG. 3.

Figure 7A:
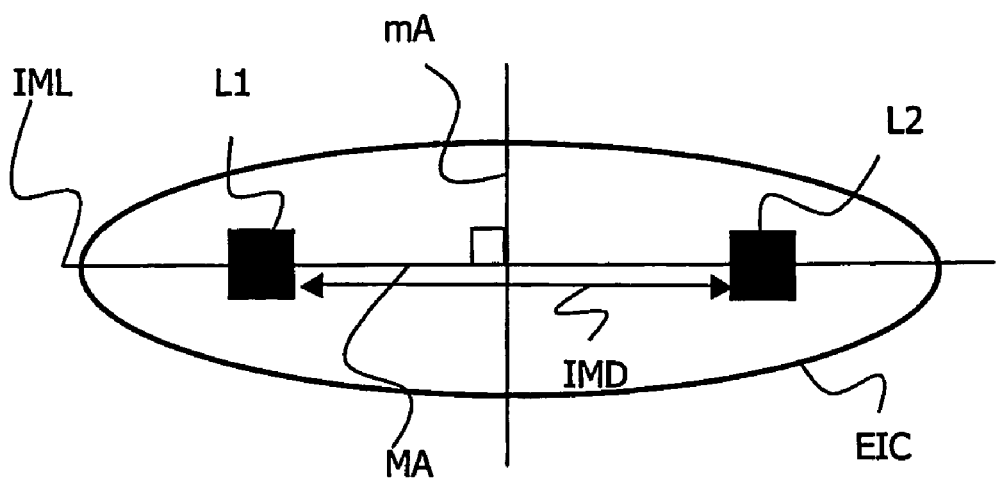
FIGS. 7a and 7b illustrate possible initializations of an active contour according to the invention.

As shown in FIG. 7*a*, said initialization sub-means 61 may use the marker locations ($L_1$, $L_2$) to derive an elliptical initial contour EIC defined by a major axis MA equal to a distance between markers $L_1$ and $L_2$ and called an inter-marker distance IMD and a minor axis mA equal to a percentage of said inter-marker distance IMD.

Figure 7B:
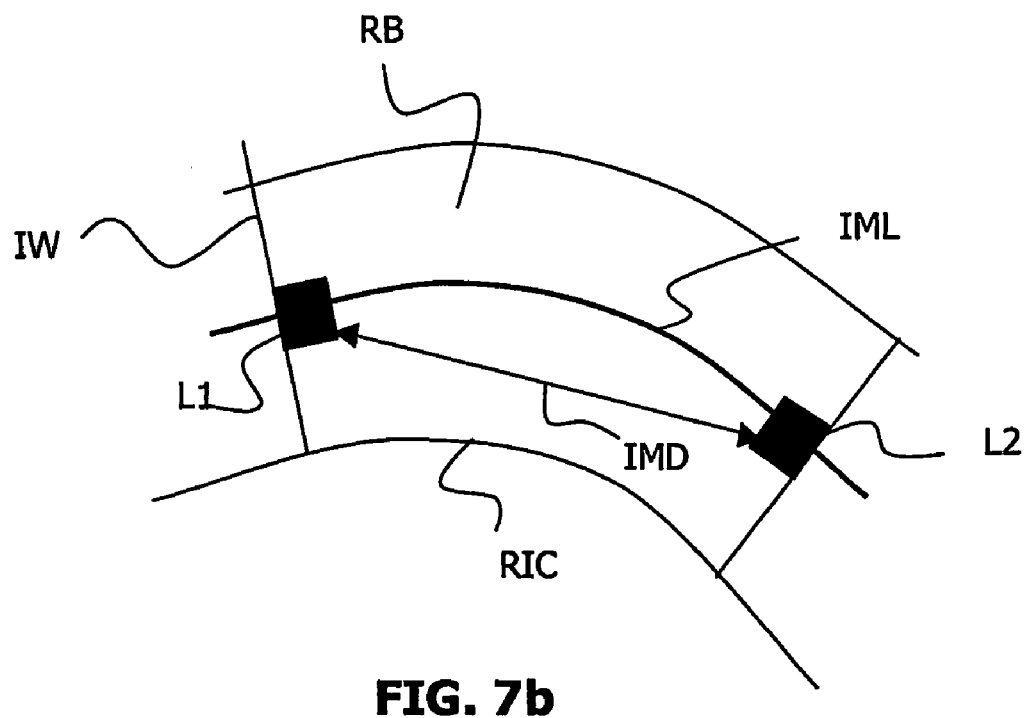
Figure 8A:
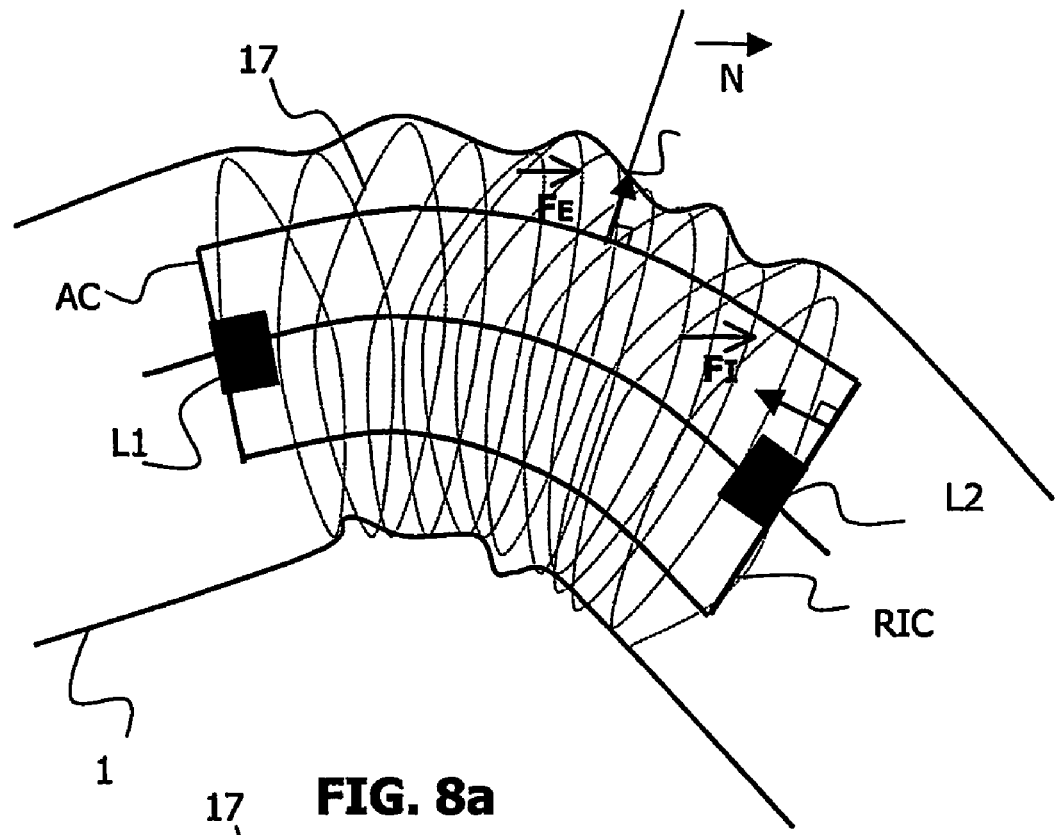
FIG. 8a and FIG. 8b show how an active contour is inflated to match the borders of an object of interest.

If the artery is curved, it may be more realistic (as shown in FIG. 7*b*) to take as an initial contour a contour RIC of a rubber band RB having the inter-marker line as a medial axis. Said initial contour EIC or RIC is then used as a starting position for an active contour AC, shown FIG. 8*a*, which is deformed by said active contour sub-means 62. A dynamic of the active contour AC is given by a law of motion. The deformation of said active contour AC implies two types of forces, which are applied at each point of the active contour AC on a normal to said contour:

external forces $\vec{F}_E$, that constrain the active contour AC to stick to the borders of the object of interest. They are for instance related to the above-calculated ridgeness of the stent borders. A strength of said external force $\vec{F}_E$ is determined by the highest ridgeness encountered on the normal $\vec{N}$ to the active contour AC at a given point P, internal forces $\vec{F}_I$ that represent regularization forces, that constrain the active contour AC to be smooth. They are usually based on curvature constraints.

Figure 8B:
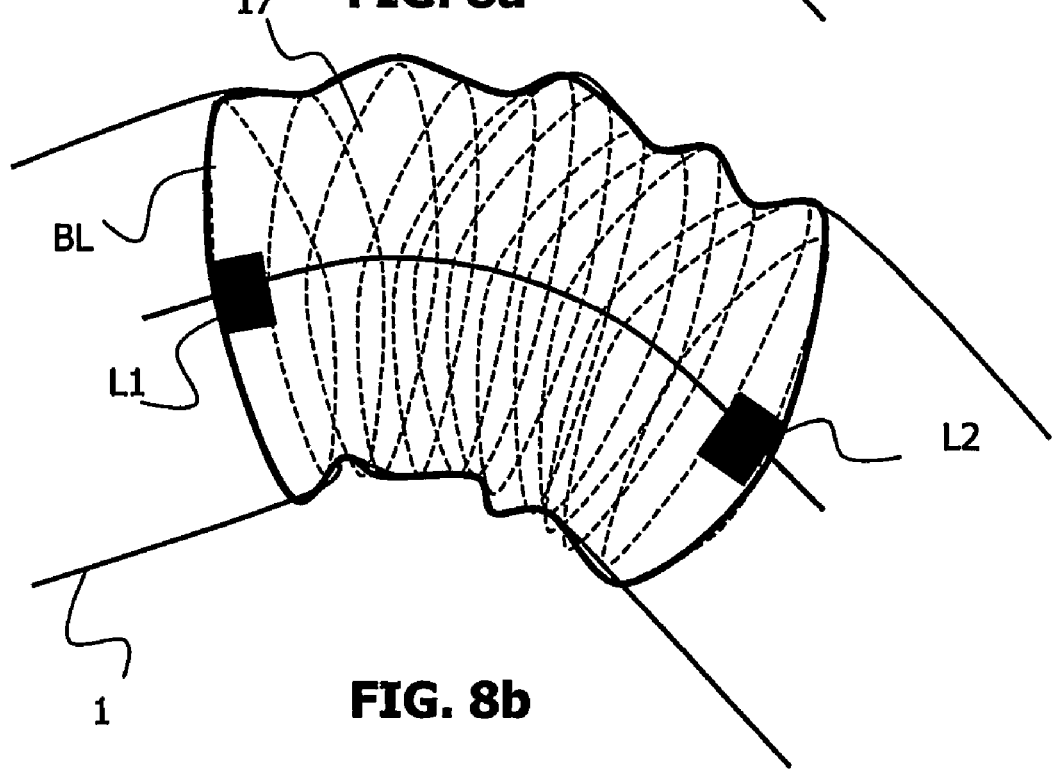

It is to be noted that the inter-marker line IML has a non-negligible ridgeness due to the guide wire contrast. Said ridgeness may cause parasitic external forces that have to be eliminated, in order to prevent the active contour from being attracted by said inter-marker line IML. This is done easily since the location of said inter-marker line is well known. When said external and internal forces counterbalance each other, said active contour AC stops in a final position, which is the location of the borders BL of the object of interest as shown in FIG. 8*b*.

Figure 9:
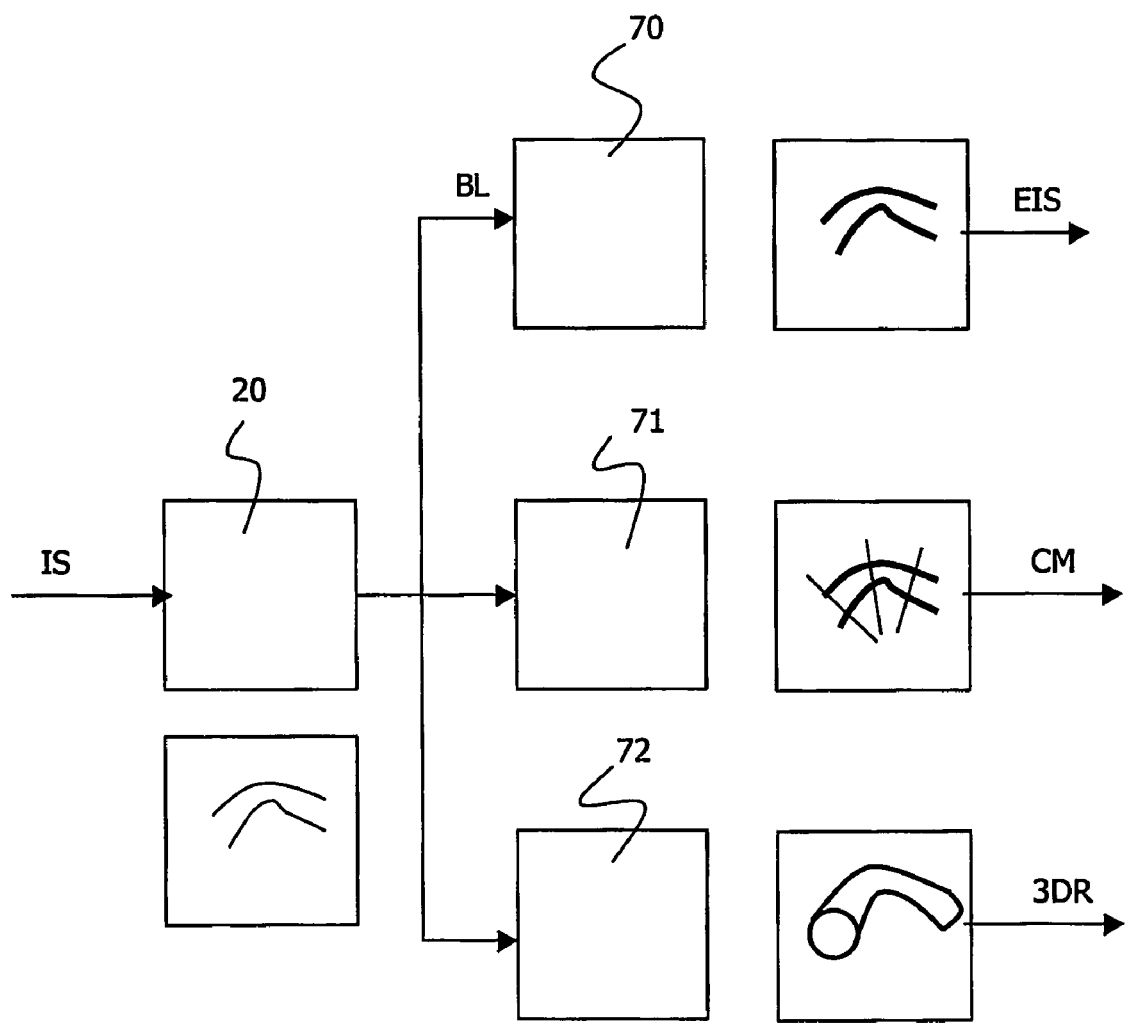
FIG. 9 shows three possible applications of detecting the borders of an object of interest: an object enhancement, a measurement of characteristics of the object of interest and a 3D representation of the object of interest.

In a second embodiment of the invention, the viewing system (as shown in FIG. 9) also comprises enhancement means 70 for enhancing said borders using said location of borders BL and for delivering an enhanced sequence of images EIS. Since said location of borders BL is known, the borders of the object of interest are enhanced very easily. Said borders are formed by points that have a gray level value. Said enhancement means 70 simply consist in increasing said gray level values so as to make the borders more visible. An outstanding enhancement is thus obtained and the main issue is to tune the enhancement so as to keep the enhanced sequence of images EIS acceptable for the practitioner.

In a third embodiment of the invention, the viewing system (as shown FIG. 9) also comprises measurement means 71 for measuring characteristics CM of said object of interest using said location of borders BL. An interesting characteristic measure of a tubular object like a stent or an artery is a collection of widths of said object measured at several locations along a length of said object, for instance along said inter-marker line IML for a stent or along the tip for a stenosis. Variations of said widths may indicate whether the stenosis has been properly reduced or whether the stent has been properly expanded.

It is to be noted that the invention is not limited to width measures. The knowledge of the stent or of the artery borders also enables for instance an estimation of an agent contrast flow in the stenosis area to be derived, by measuring the mean contrast of contiguous sections of the artery at different times.

In a fourth embodiment of the invention, the viewing system (as shown FIG. 9) also comprises 3D representation means 72 for delivering a three-dimensional (or 3D) representation 3DR of said object of interest using said location of borders BL. Such a 3D representation of a tubular object of interest, like an artery or a stent is easily obtained from two views ($I_0$, $I_0'$), which are preferably orthogonal views of said tubular object. It is not an issue in the domain of angiography, where an X-ray C-arm medical examination apparatus may provide two views in directions perpendicular to the axis of the tubular object and perpendicular to each other. It is also to be noted that very little distortion is introduced since the patient is placed at the center of the medical examination apparatus.

Figure 10:
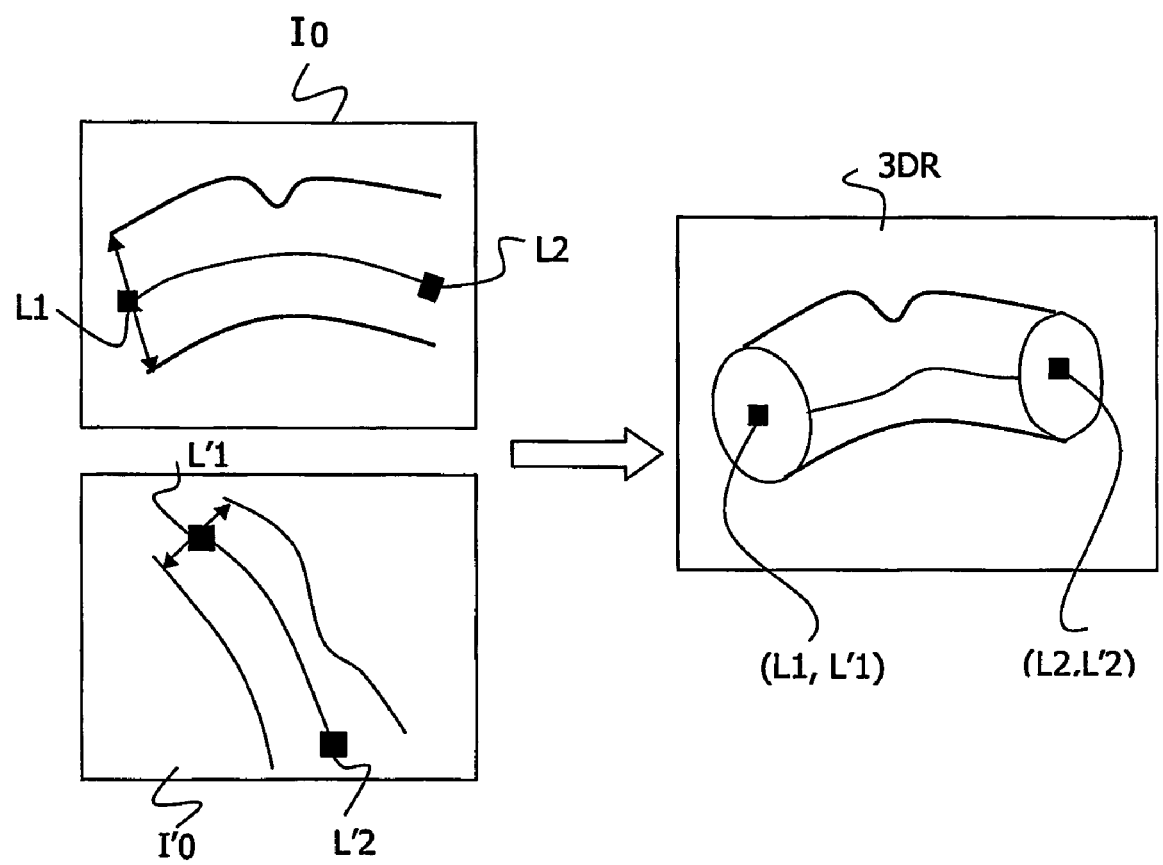
FIG. 10 shows a simple 3D model for building a 3D representation of a tubular object of interest like a stent or an artery, FIG. 11 describes the local registering means for combining a sequence of reference images a sequence of enhanced images produced by the enhancement means according to the invention.

The localizers ($L_1$, $L_2$, $L'_1$, $L'_2$) detected in each sequence of images are matched and define a 3D referential in which all the points of the borders of the object of interest may be positioned in 3D. It is then possible to obtain 3D measurements of the object of interest and 3D visualizations. In particular, if the geometry of the object of interest is known or if a 3D model is available, it is possible to fit said model to the border points and object characteristics so as to obtain a realistic 3D viewing of the object of interest. In the domain of angiography, a 3D model like a cylindrical shape with a circular or an elliptical section may be used for a 3D representation of a stent or an artery (as shown in FIG. 10). Said 3D representation may offer information about the stent placement or the stent bending for instance.

A sequence of reference images, also called peri-interventional images, is usually acquired before the intervention with an injection of a contrast agent, which makes arteries visible. Said sequence of reference images, therefore, comprises features like the artery borders, which help the practitioner to locate and assess a stenosis before starting the procedure of stent placement. During the procedure of stent placement, contrast agent is generally not injected and, consequently, the artery and stenosis borders are usually visible neither in the image sequence IS nor in the sequence of enhanced images EIS provided in real time by the viewing system according to the invention. A way of improving the accuracy of the visualization is to provide the practitioner with the features of the sequence of reference images during the procedure of stent placement.

In a fifth embodiment of the invention, the viewing means therefore comprise local registration means 80 for registering said sequence of reference images or part of it with respect to said sequence of enhanced images EIS so as to form a new sequence of enhanced images, in which said sequence of reference images and said sequence of enhanced images are combined.

Figure 11:
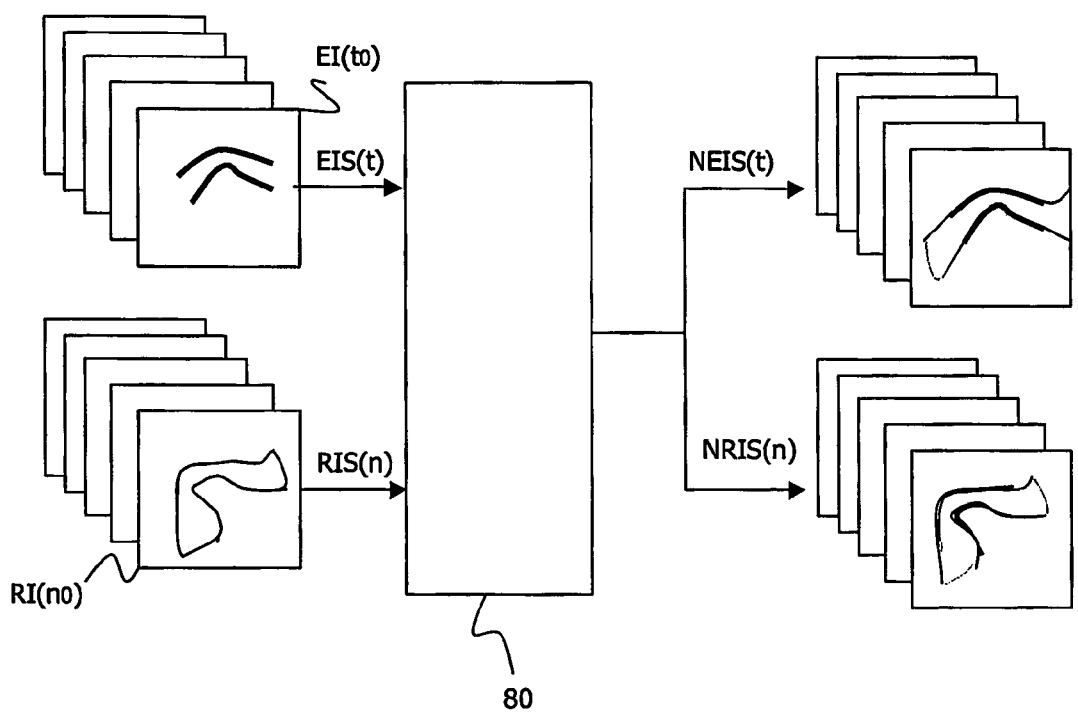

The sequence of enhanced images EIS output by the enhancement means 70 is a live sequence, which will be denoted by EIS(t) hereinafter. The sequence of reference images RIS(n) is a stored sequence, comprising a number n of images. Referring to FIG. 11, both sequences are entered in the local registration means 80. A reference image RIS($n_0$) is registered using for instance a block-matching technique. Gray level values of said reference image RI are combined with the gray level values of the corresponding enhanced image EI($t_0$) using for instance an α-blending technique. The correspondence between $n_0$ and $t_0$ can be evaluated through the compensation of the respiratory and heart motions. A new enhanced image NEI($t_0$) is output, in which the features of the reference image RI($n_0$), like the borders of the artery are seen through the enhanced image EI($t_0$).

It should be noted that the sequence of enhanced images EIS(t) can as well be registered with respect to the sequence of reference images RIS(n) so as to provide a new sequence of reference images NRIS(n) (as shown in FIG. 11). In said new sequence of reference images enhanced features of an enhanced image EI($t_0$), like the stent borders, are made visible through the corresponding reference image RI($n_0$).

Figure 12:
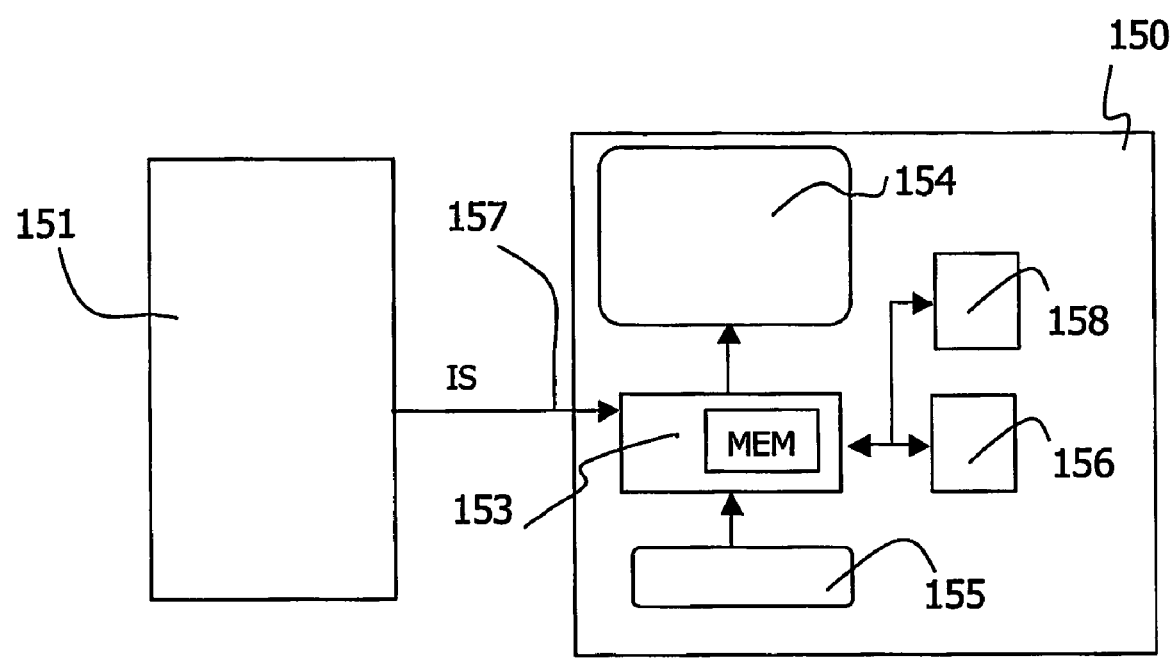
FIG. 12 is a functional block diagram of a medical examination apparatus using the system of the invention.

FIG. 12 shows the basic components of an embodiment of an image viewing system 150 in accordance with the present invention, which is incorporated in a medical examination apparatus. As indicated schematically in FIG. 11, said medical examination apparatus has acquisition means 151 for acquiring a sequence of images IS. Said sequence of images IS is processed by a processing device 153 comprising detection means as described above. The image viewing system 150 is generally used in the intervention room or near the intervention room for the processing of real time images. Should steps of the present method be applied to stored medical images, for example for estimating medical parameters, the system for processing the data of the stored images would be called an image viewing station. The medical examination apparatus provides the image data IS via a connection 157 to the processing device 153. Said processing system 153 provides processed image data to display and/or storage means. The display means 154 may be a screen. The storage means may be a memory MEM of the processing system 153. Said storage means may alternatively be external storage means. This processing device 153 may comprise a suitably programmed computer, or a special purpose processor having circuit means such as LUTs, Memories, Filters, Logic Operators, that are arranged to perform the functions of the steps of the method according to the invention. The image viewing system 150 may also comprise a keyboard 155 and a mouse 156. Icons may be provided on the screen to be activated by mouse clicks, or special pushbuttons may be provided on the system, to constitute control means 158 for the user to start, to control the duration or to stop the processing means of the system at selected instants.

The present invention is not limited to two-dimensional image sequences. As already mentioned above, a volume of angiographic data, comprising several views of a region of interest of the human body at a same time t, may be acquired by an X-ray C-arm medical examination apparatus. The described processing steps may be applied to each view produced at the time t.

The present invention is applicable regardless of the medical imaging technology that is used to generate the initial data. Various modifications can be made to the order in which processing steps are performed in the described specific embodiment. The described processing steps applied to medical image data can advantageously be combined with various other known processing/visualization techniques.

The drawings and their description hereinbefore illustrate rather than limit the invention. It will be evident that there are numerous alternatives, which fall within the scope of the appended claims. In this respect the following closing remarks are made: There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions, nor does it exclude that a single function is carried out by an assembly of items of hardware or software or both.

Any reference sign in a claim should not be construed as limiting the claim. Use of the verb "to comprise" and its conjugations does not exclude the presence of elements or steps other than those stated in a claim. Use of the article "a" or "an" preceding an element or step does not exclude the presence of a plurality of such elements or steps.

The invention claimed is:

1. A viewing system, comprising acquisition means for acquiring a sequence of images, detection means for detecting an object of interest in said sequence of images
said detection means comprising:
localizer detection sub-means for detecting a location of localizers related to said object of interest,
border detection sub-means for detecting a location of borders related to said object of interest, using said location of localizers,
enhancement means for enhancing said borders using said location of borders and delivering a sequence of enhanced images, and
viewing means for displaying said sequence of images, wherein said viewing means also comprise local registering means for registering a sequence of reference images with respect to said sequence of enhanced images so as to form a new sequence of enhanced images, in which said sequence of enhanced images and said sequence of reference images are combined.

2. A viewing system, comprising acquisition means for acquiring a sequence of image, detection means for detecting an object of interest in said sequence of images
said detection means comprising:
localizer detection sub-means for detecting a location of localizers related to said object of interest,
border detection sub-means for detecting a location of borders related to said object of interest, using said location of localizers,
enhancement means for enhancing said borders using said location of borders and delivering a sequence of enhanced images, and
viewing means for displaying said sequence of images, wherein said viewing means also comprise local registering means for registering said sequence of enhanced images with respect to a sequence of reference images so as to form a new sequence of reference images, in which said sequence of enhanced images and said sequence of reference images are combined.

3. A viewing system as claimed in claim 2 wherein said border detection sub-means comprise:
initialization sub-means for building an initial contour of said borders, containing said localizers, from a priori knowledge about said object of interest, and
active contour sub-means for moving said initial contour under the effect of forces related to said object of interest within said sequence of images.

4. A viewing system as claimed in claim 2 comprising measurement means for measuring characteristics of said object of interest using said location of borders.

5. A viewing system as claimed in claim 4, wherein said characteristics are widths of said object of interest along a length of said object of interest.

6. A viewing system as claimed in claim 2 wherein said acquisition means are able to acquire at least two views of said object of interest, said viewing system also comprising 3D representation means for delivering a 3D representation of said object of interest from said views and said location of borders.

7. A viewing system as claimed in claim 6, wherein a cylindrical model is used by said 3D representation means when said object of interest has a tubular shape.

8. A viewing system as claimed in claim 2, wherein said object of interest is a stenosis or a stent and said localizers are a tip or balloon markers.

9. A medical examination imaging apparatus comprising a viewing system as claimed in claim 2.

10. A method, comprising a detection step for detecting an object of interest in a sequence of images, said detection step comprising sub-steps of:
localizer detection for detecting a location of localizers related to said object of interest, wherein the localizers comprise simply shaped objects of radio-opaque material, and
border detection for indirectly detecting a location of borders related to said object of interest, using said location of the localizers, the method further comprising:
enhancing said borders using said location of borders and delivering a sequence of enhanced images, and
displaying said sequence of images, wherein displaying also comprises registering a sequence of reference images with respect to said sequence of enhanced images so as to form a new sequence of enhanced images, in which said sequence of enhanced images and said sequence of reference images are combined.

11. A computer program comprising a set of instructions embodied or encoded on a computer-readable medium for implementing a method as claimed in claim 10 when said program is executed by a processor.

12. A device comprising detection means for detecting an object of interest in a sequence of images, said detection means comprising:
localizer detection sub-means for detecting a location of localizers related to said object of interest, wherein the localizers comprise simply shaped objects of radio-opaque material, and
border detection sub-means for indirectly detecting a location of borders related to said object of interest, using said location of the localizers, the device further comprising:
means for enhancing said borders using said location of borders and delivering a sequence of enhanced images, and
means for displaying said sequence of images, wherein displaying means also comprise local registering means for registering a sequence of reference images with respect to said sequence of enhanced images so as to form a new sequence of enhanced images, in which said sequence of enhanced images and said sequence of reference images are combined.

13. A viewing system as claimed in claim 1, wherein said border detection sub-means comprise:
   initialization sub-means for building an initial contour of said borders, containing said localizers, from a priori knowledge about said object of interest,
   active contour sub-means for moving said initial contour under the effect of forces related to said object of interest within said sequence of images.

14. A viewing system as claimed in claim 1, comprising measurement means for measuring characteristics of said object of interest using said location of borders.

15. A viewing system as claimed in claim 14, wherein said characteristics are widths of said object of interest along a length of said object of interest.

16. A viewing system as claimed in claim 1, wherein said acquisition means are able to acquire at least two views of said object of interest, said viewing system also comprising 3D representation means for delivering a 3D representation of said object of interest from said views and said location of borders.

17. A viewing system as claimed in claim 1, wherein a cylindrical model is used by said 3D representation means when said object of interest has a tubular shape.

18. A viewing system as claimed in claim 1, wherein said object of interest is a stenosis or a stent and said localizers are a tip or balloon markers.

* * * * *